United States Patent Office 2,774,167
Patented Dec. 18, 1956

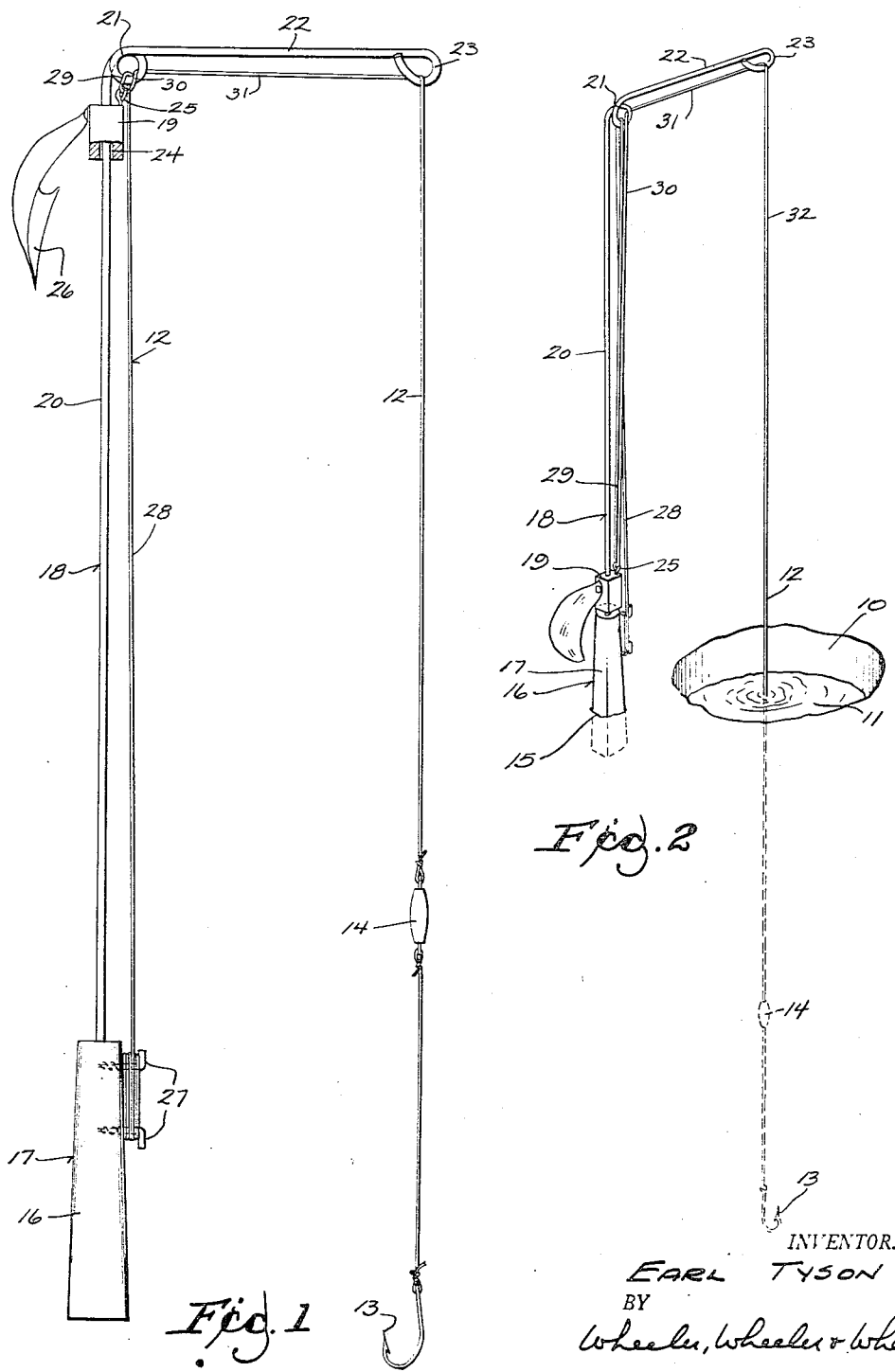

2,774,167

ICE FISHING DEVICE

Earl Tyson, Oshkosh, Wis.

Application December 30, 1954, Serial No. 478,635

2 Claims. (Cl. 43—17)

My invention relates to improvements in an ice fishing device.

In carrying on an ice fishing operation where a hook and line is to be operated through a hole in the ice, there are many problems to be met by the apparatus which is necessarily used if more than one hook and line is to be tended by a single fisherman. These problems include not only the required technique in the operation of a hook and line to catch specific types of fish, but also the fundamental requirements imposed by weather and ice conditions. There are certain operating elements which will normally become ice coated and provision must be made for maintaining the entire apparatus in operative condition despite adverse circumstances.

My ice fishing device is in the general class of apparatus which has been termed a tip-up, although it will be obvious from the description below that this term is not quite apt as applied to the specific mechanism which I have devised. The term tip-up relates to that portion of the apparatus that provides a signal to the fisherman that there is some activity with respect to the hook and line which the particular apparatus serves. My device includes such a signal and a simplified apparatus for operating it in conjunction with other mechanical features which permit a fish to "run" and which will provide the equivalent of a fisherman's manipulation of the line at the termination of the "run."

In the drawings:

Fig. 1 is an elevation of a complete ice fishing device made in accord with my invention.

Fig. 2 is a view in perspective showing my ice fishing device in use, the environmental features being somewhat diagrammatic.

As shown in Fig. 2, my device in use is set up immediately adjacent to a hole 10, which has been chiseled through the ice so as to provide a relatively small area of open water at 11 through which an ordinary fish line 12 may be dropped with the usual hook 13, sinker 14 and any other conventional lure or fishing equipment carried by the line 12. At a short distance, preferably four or five inches from the hole 10, a shallow pocket is chiseled in the ice, for instance at 15, as shown in Fig. 2, and my ice fishing device indicated generally at 16 is mounted in this pocket by the well known method of placing chip ice and a small amount of water around the base or handle 17 which soon is frozen in solidly.

The larger structural elements of my ice fishing device include the base or handle 17 into an end of which is solidly secured a wire spring-like standard 18, and a signal spool weight 19 slidably mounted upon this standard.

The standard 18 has a substantially straight staff 20 the outer or upper end of which is developed into a guide loop at 21, which will hereinafter be referred to as the angle guide. An integrally extended outstanding portion 22 of the same spring wire-like material as that comprising the staff 20 terminates at its outer end in a loop at 23, which will hereinafter be referred to as the line guide. The length of the outstanding portion 22 of the standard 18 may be any suitable length within certain limits as described below, but I find that approximately eight to ten inches is practical in most instances to support a fish line 12 and provide the spring action and fish line operating technique which is most successful in ice fishing.

The spool weight 19 is made to slide along the exterior surfaces of the staff 20. As shown in the drawings, it is provided with a bore 24 substantially larger than the staff 20 so that it may loosely reciprocate on the staff thus avoiding any tendency for the spool to be frozen to the staff. I prefer to have the spool 19 made of wood or plastic, which will have less tendency to be secured to the staff by frosting moisture.

In the upper portion of the spool weight 19, I provide an eyelet 25 or any other form of pulley-like element through which the line 12 may extend. At 26, I have shown a form of signal pennant which will assist the fisherman in discerning the position of the spool as it may be reciprocated along the staff 20.

The fish line is stored upon a bobbin or pair of pegs at 27 along the upper portion of the base 17, and the amount of line which is unwound from the storage place at 27 extends up along and spaced from the staff 20 in a reach 28 so as to pass through the angle guide 21. It then extends downwardly again along the staff 20 in a reach 29 and extends through the eyelet or pulley 25; thence upwardly again in a reach 30 and through the angle guide 21 so as to change direction and extend outwardly along the outstanding portion 22 in a reach 31, through the line guide 23, where it changes direction again and extends downwardly in a reach 32, which by gravity extends to the sinker 14 and hook 13 as will be clear from an examination of the drawings.

When my fishing device is set up as shown in Fig. 2, the spool weight 19 is of sufficient weight to be held normally in the position shown in Fig. 2. The fisherman will provide enough length of line 12 to dispose the hook 13, suitably baited, at the level above the bottom where he prefers to fish. When a fish strikes the bait on the hook 13 certain fish, for instance wall-eyed pike, tend to mouth the bait and "run" with it a short distance. The reaches 29 and 30 provide adequate length of line for this "run" since the pull of the fish will move the spool slidably up the staff 20 from the position shown in Fig. 2 to the position shown in Fig. 1. In the ordinary fisherman's technique of handling a line under these general circumstances, he will terminate the short "run" by providing a fairly sudden stoppage of the run of the line whereby to "set" the hook. This technique is duplicated in the operation of my device when the spool 19 or the eyelet 25 strikes the angle guide 21. A snubbing action of the line about the line guiding parts assists in terminating the "run."

Throughout the sequence of the operations thus far described, the strength of the spring wire material of the staff 20, angle guide loop 21 and the outstanding portion 22 substantially resists any tendency to bend the spring wire, but when the spool and eyelet reach the top of the staff, the staff bends and there is a certain degree of hinge-like action about the line guide 21. Also there is spring action in the outstanding portion 22 thus simulating a manual technique in fish line operation.

The length of the run referred to above is limited by the length of the staff 20 or the distance which the spool 19 is permitted to reciprocate along the staff. A practical length of the staff 20 has been found to be two feet thus providing, in the length of the two reaches 29 and 30, approximately four feet of run.

Throughout the fishing operation, the depending line 32 from the line guide 23 is spaced from the margins of the hole 10 through the ice, and when there is activity with respect to the hook 13, there is an immediate signal to the fisherman provided by the change of position of the spool 19 with its pennant 26. The flexing of the staff 20 and the outstanding portion 22 provide not only the simulated manual technique of the fisherman but also clear the moving parts of ice incrustation.

I claim:

1. A fishing device having a base, a resilient wire-like standard extending substantially rectilinearly from said base, and an outstanding portion joined to and extending from said standard and terminating in a line guide, an angle guide positioned adjacent the junction of the standard and said outstanding portion, a signal member having a pulley-like member and mounted to reciprocate freely along said standard, a line secured to said base and extending successively through the angle guide, through the pulley-like member, back through the angle guide and through the terminal line guide on said outstanding portion to a fish hook, whereby a pull on the line portion extending from said terminal guide in the direction of said hook will flex the standard and the outstanding portion and will pull upwardly on the signal member to move the same and to provide for an extension of line for the run of a fish pulling on the line.

2. A fishing device comprising a resilient wire-like standard having an upright portion and an outstanding portion, a weighted member mounted for reciprocation on said upright portion of said standard and positioned exteriorly thereof, said weighted member having a pulley-like fish line guide, an angle guide at one end of said upright portion of the standard, said outstanding portion extending approximately at right angles to said upstanding portion of the standard and terminating in a terminal line guide, and a fish line secured adjacent the end of the upright portion of the standard spaced from the angle guide, said line extending through the angle guide and terminal guide and having a loop portion extending through the pulley-like member.

References Cited in the file of this patent

UNITED STATES PATENTS

| 76,489 | McCaughan | Apr. 7, 1868 |
| 840,598 | Tuttle | Jan. 8, 1907 |
| 2,177,912 | Spitz et al. | Oct. 31, 1939 |
| 2,481,881 | Schneider | Sept. 13, 1949 |
| 2,628,443 | Weckerling | Feb. 17, 1953 |

FOREIGN PATENTS

| 169,774 | Germany | Apr. 14, 1906 |